(12) United States Patent
Carson

(10) Patent No.: US 7,907,492 B1
(45) Date of Patent: Mar. 15, 2011

(54) DATA STORAGE MEDIUM WITH IMPROVED MULTI-SESSION RECORDING FORMAT

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 1669 days.

(21) Appl. No.: 11/083,613

(22) Filed: Mar. 17, 2005

Related U.S. Application Data

(60) Provisional application No. 60/554,301, filed on Mar. 17, 2004.

(51) Int. Cl.
*G11B 5/09* (2006.01)

(52) U.S. Cl. ............... 369/59.25; 369/47.13; 369/47.16; 369/30.05; 369/30.07; 369/30.19

(58) Field of Classification Search ............... 369/275.1, 369/275.3, 275.4, 286, 53.23, 59.25, 47.13, 369/47.16, 30.05, 30.07, 30.19; 386/125; 707/1, 205

See application file for complete search history.

(56) References Cited

U.S. PATENT DOCUMENTS

| | | | | |
|---|---|---|---|---|
| 5,400,319 A * | 3/1995 | Fite et al. | | 369/275.5 |
| 5,617,384 A * | 4/1997 | Yonemitsu et al. | | 369/30.04 |
| 5,661,715 A * | 8/1997 | Blaukovitsch | | 369/275.4 |
| 5,745,902 A | 4/1998 | Miller et al. | | |
| 5,793,779 A * | 8/1998 | Yonemitsu et al. | | 714/764 |
| 5,825,726 A * | 10/1998 | Hwang et al. | | 369/30.05 |
| 6,072,759 A * | 6/2000 | Maeda et al. | | 369/59.25 |
| 6,215,758 B1 * | 4/2001 | Horimai et al. | | 369/275.3 |
| 6,320,840 B1 | 11/2001 | Oh et al. | | |
| 6,423,478 B1 | 7/2002 | Ha | | |
| 6,570,837 B1 * | 5/2003 | Kikuchi et al. | | 369/275.1 |
| 6,687,211 B2 * | 2/2004 | Sawabe et al. | | 369/275.3 |
| 6,898,174 B2 * | 5/2005 | Kuribayashi et al. | | 369/275.4 |
| 7,161,885 B2 * | 1/2007 | Hahn | | 369/53.21 |
| 7,513,824 B2 * | 4/2009 | Kanno et al. | | 463/6 |
| 2002/0012315 A1 * | 1/2002 | Iida et al. | | 369/275.1 |
| 2003/0007447 A1 | 1/2003 | Yeh et al. | | |
| 2003/0147323 A1 * | 8/2003 | Sako et al. | | 369/53.22 |
| 2003/0228141 A1 | 12/2003 | Ballantyne | | |
| 2004/0054764 A1 * | 3/2004 | Aderton et al. | | 709/223 |
| 2004/0156290 A1 | 8/2004 | Seo | | |
| 2004/0175158 A1 | 9/2004 | Chen | | |
| 2005/0030874 A1 * | 2/2005 | Sasaki | | 369/94 |
| 2006/0077882 A1 * | 4/2006 | Lee et al. | | 369/275.1 |

OTHER PUBLICATIONS

Richard Immers and Gerald G. Neufeld, Inside Commodore DOS, 1984, Reston Publishing Company, Inc., pp. 35, 41, and 42.*

* cited by examiner

*Primary Examiner* — Wayne R Young
*Assistant Examiner* — Brenda Bernardi
(74) *Attorney, Agent, or Firm* — Fellers, Snider et al.

(57) ABSTRACT

A data storage medium, and an apparatus and method for formatting the same. The medium is preferably characterized as a hybrid or recordable optical disc, and includes a pre-recorded storage area and a recordable storage area. The pre-recorded storage area stores file system data which identifies at least one file to be stored to the recordable storage area during a subsequent recording session, with the file system data having been stored to the pre-recorded storage area during a previous recording session. The file system data further preferably identifies at least one file stored to the pre-recorded storage area during the previous recording session. The pre-recorded and subsequently stored files are preferably disposed within the same logical track on the medium. The pre-recorded file system data includes entries for the subsequently added file(s), and eliminates the need for multiple copies of the file system on the medium.

25 Claims, 4 Drawing Sheets

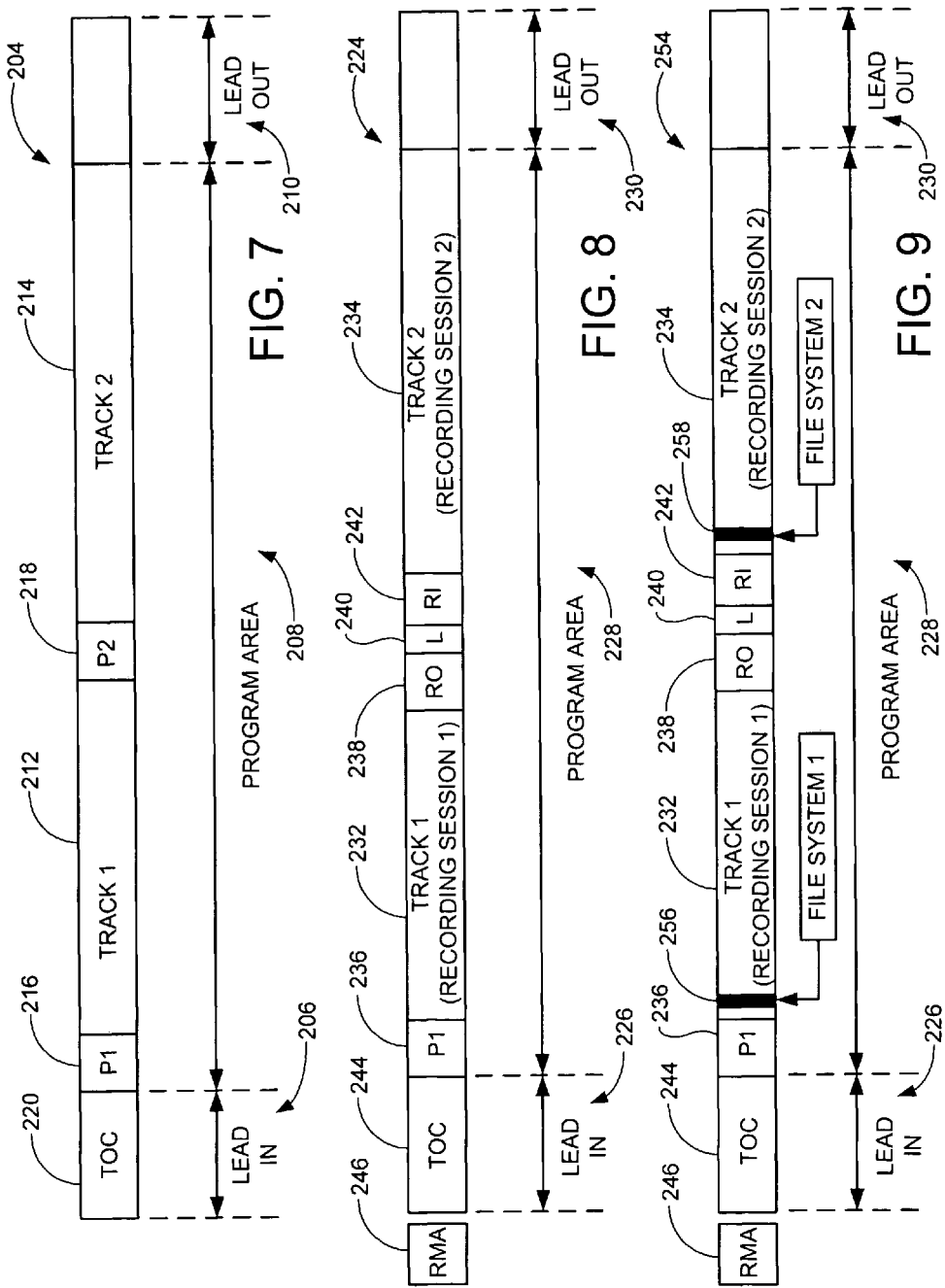

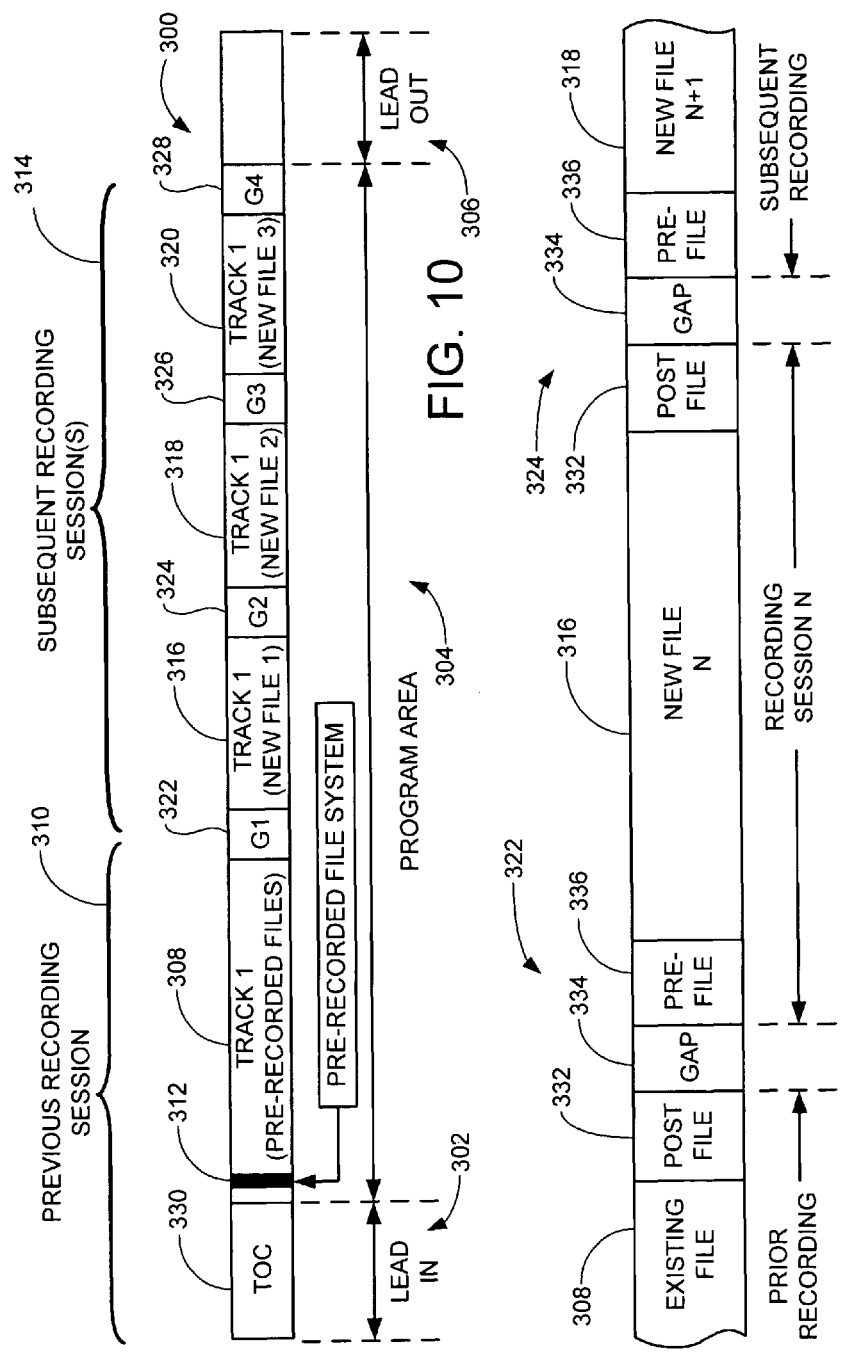

DATA STORAGE MEDIUM WITH IMPROVED MULTI-SESSION RECORDING FORMAT

RELATED APPLICATIONS

This application claims domestic priority under 35 U.S.C. §119(e) to U.S. Provisional Application No. 60/554,301 filed Mar. 17, 2004.

FIELD OF THE INVENTION

The present invention relates generally to the field of data storage media and more particularly, but without limitation, to a storage medium, such as an optical disc, with an improved multi-session recording format.

BACKGROUND

Data storage media are used to store and retrieve large amounts of digitally encoded data in a fast and efficient manner. Such media have been commercially provided in a number of different forms, such as magnetic, optical and solid-state (e.g., flash memory, etc.).

Of particular interest are optical discs, which store data in a form that can be optically transduced in a readback system. Due to their portability, high data storage capabilities, and relative resistance to damage during handling, optical discs largely remain the worldwide medium of choice to provide and distribute video, audio, software (business, games, etc.), and other types of content.

Optical discs can be provided in a variety of formats, such as compact disc (CD), digital versatile disc (DVD), high density DVD, Blu-Ray, hybrid, mini-disc, etc. Optical discs can also be pre-recorded or recordable by the end user (once or many times), which further enhances the versatility of the media across a number of different markets.

The relative ease with which the content of a particular optical disc can be replicated, however, also constitutes one of the larger issues facing the industry; namely, the protection of intellectual property rights in the content stored on the disc. Along these lines, a number of efforts have been taken to copy protect discs so that unauthorized copying of the contents is prevented, or at least reduced.

Some content providers have desired the ability to append additional information to an optical disc (or other medium) after manufacturing, for copy protection or other purposes. Such information might include a unique serial number, a customer ID, updated files for the pre-recorded data on the disc, etc.

To this end, hybrid optical discs have been proposed with both pre-recorded and recordable portions. The "base" content is stored to the pre-recorded portion during disc manufacturing, and the "new" content is recorded to the recordable portion(s) of the disc at a later time.

Hybrid optical discs often utilize well-known multi-session recording techniques (see e.g., ISO 9660/13490, etc.) to control the writing of data over multiple sessions. For example, the base content is written during a first session, and new data are added to the disc during subsequent recording sessions using a recorder or similar equipment. Such multi-session techniques are also typically used on "regular" (non-hybrid) recordable discs when multiple recording sessions are made.

While a variety of multi-session techniques have been proposed, one commonly employed approach involves recording each session as a new track on the disc. Each new track generally includes an updated copy of the disc file system used to identify the file structure of the disc. Depending on the format, readback systems are generally instructed to find the last (and hence, most up to date) copy of the file system on the disc, and ignore the other, older copies.

Accordingly, with the continued worldwide commercial interest in providing content on optical discs and other types of storage media, there remains a continued need for improvements in the manner in which the content is arranged and identified on the medium. It is to these and other improvements that the present invention is generally directed.

SUMMARY OF THE INVENTION

The present invention is generally directed to a data storage medium, and a method and apparatus for formatting the same. The medium is preferably characterized as an optical disc.

In accordance with preferred embodiments, the medium comprises a pre-recorded storage area and a recordable storage area. The pre-recorded storage area stores file system data which identifies at least one file to be stored to the recordable storage area during a subsequent recording session. The file system data are stored to the pre-recorded storage area during a previous recording session. In this way, the file system generally operates to identify file(s) that will be added to the medium at a later date, but don't yet exist on the medium (or at all).

Preferably, the file system data further identifies at least one file stored to the pre-recorded storage area during the previous recording session. Both the previously recorded file(s) and the subsequently recorded file(s) are preferably disposed within the same logical track on the medium.

The file system data preferably comprises a placeholder entry for each new file, with the placeholder entry preferably identifying a start address and an end address for said file.

In some embodiments, the medium is characterized as a hybrid optical disc so that the pre-recorded storage area is formed from a sequence of embossed pits and lands, and the recordable storage area is an area with a recordable layer which stores data in response to application of a write beam thereto.

In other embodiments, the medium is characterized as a recordable optical disc with a recordable layer which stores data in response to application of a write beam thereto. In this case, the pre-recorded storage area comprises a first portion of the layer that has been exposed to the write beam to write data to the first portion, and the recordable storage area comprises a second portion of the layer that has not yet been written through exposure to the write beam.

The file to be subsequently stored to the medium can comprise any number, sizes and types of files, including a software patch to complement an executable file stored in the pre-recorded storage area, a unique serial number for the medium, etc. Advantageously, the resulting medium only has one set of file system data even in view of multiple recording sessions.

These and various other features and advantages of the present invention will be apparent from a reading of the following detailed description in conjunction with the appended drawings.

BRIEF DESCRIPTION OF THE DRAWINGS

FIG. 7 provides a generalized representation of the format of a disc to which data have been written during a single recording session.

FIG. 8 provides a generalized representation of the format of a disc to which data have been written over multiple recording sessions.

FIG. 9 provides a generalized representation of the format of another disc to which data have been written over multiple recording sessions.

FIG. 10 provides a generalized representation of the format of a disc to which data have been written over multiple recording sessions in accordance with preferred embodiments of the present invention.

FIG. 11 shows portions of the view of FIG. 10 in greater detail.

DETAILED DESCRIPTION

As embodied herein, the present invention is generally directed to a data storage medium and associated method and apparatus for storing data thereto. The storage medium is preferably characterized as an optical disc, but other types of storage media are readily contemplated as well.

Figure 1:
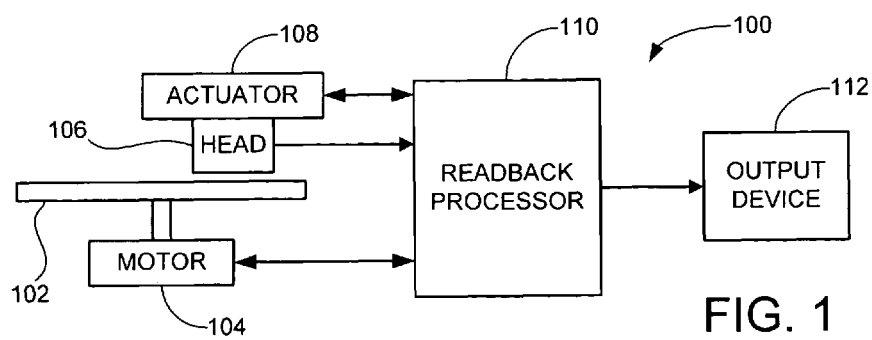
FIG. 1 shows a general block representation of a readback system used to readback data from a data storage medium, preferably comprising an optical disc.

FIG. 1 provides a simplified, functional block diagram of an optical disc readback system 100. An optical disc 102 is rotated by a disc motor 104. An optical disc pick-up assembly comprises a data transducing head assembly 106 supported by a linear actuator assembly 108.

It is common for optical discs such as 102 to have data stored at a constant linear velocity (CLV) so that the disc rotational speed is varied as the head assembly 106 moves across the radius of the disc 102, but such is not limiting.

A readback processor circuit 110 receives a modulated readback signal from the head assembly 106 and performs the appropriate signal processing and conditioning to provide an output signal to an output device 112.

The nature and character of the output device 112 will generally depend upon the type of content stored by the optical disc 102; for example, if the optical disc stores audio data, the output device 112 can comprise an automobile or home stereo system; if the optical disc stores computer data (including MP3 audio files), the output device 112 can comprise a personal computer (PC); if the optical disc stores video data, the output device 112 can comprise a television display or home theater system, etc.

Figure 2:
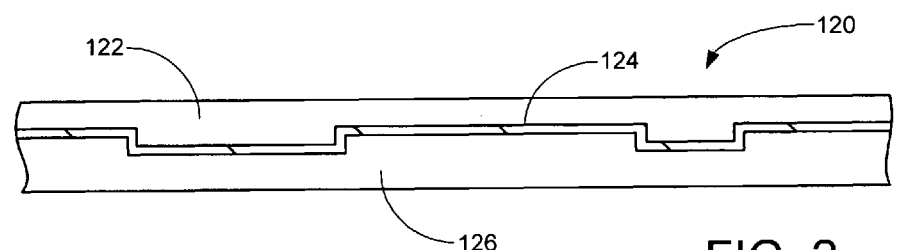
FIG. 2 provides a simplified elevational representation of a prerecorded medium to illustrate the general manner in which pits and lands are prerecorded using an embedded, internal reflective layer of material, the view in FIG. 2 generally taken along a track of the medium.

FIG. 2 provides a simplified elevational representation of a single layer, pre-recorded optical disc 120 playable by the system 100 of FIG. 1. For ease of discussion, the disc 120 has been arranged in FIG. 2 in a "top-down" read orientation; that is, the read transducer is considered as being located above and is looking down upon the disc, to be consistent with the representation in FIG. 1.

The disc 120 generally includes a substrate 122 formed of polycarbonate having an outermost diameter of nominally 120 millimeters, mm ($10^{-3}$ meters). An embedded recorded layer 124 comprises a reflective layer of material having a series of pits and lands at different internal elevations, as shown. A protective backing layer 126 is preferably formed of resin.

The depth of the pits with respect to the lands is established in relation to the wavelength of the light beam emitted by the head 106 (e.g., nominally one-quarter wavelength). In this way, the pits will have a different reflectivity as compared to that of the lands in the beam as it is reflected back from the disc 120, enabling the generation of a readback signal which is used to decode the data stored on the disc.

The disc 120 is preferably formed by generating a master disc with the desired pit and land sequence, forming a number of stampers from the master disc and then using injection molding or similar techniques to form a population of replica discs from the stampers. Pre-recorded discs such as 120 are typically formed in high volume replication facilities where large quantities of replicas are concurrently formed.

Figure 3:
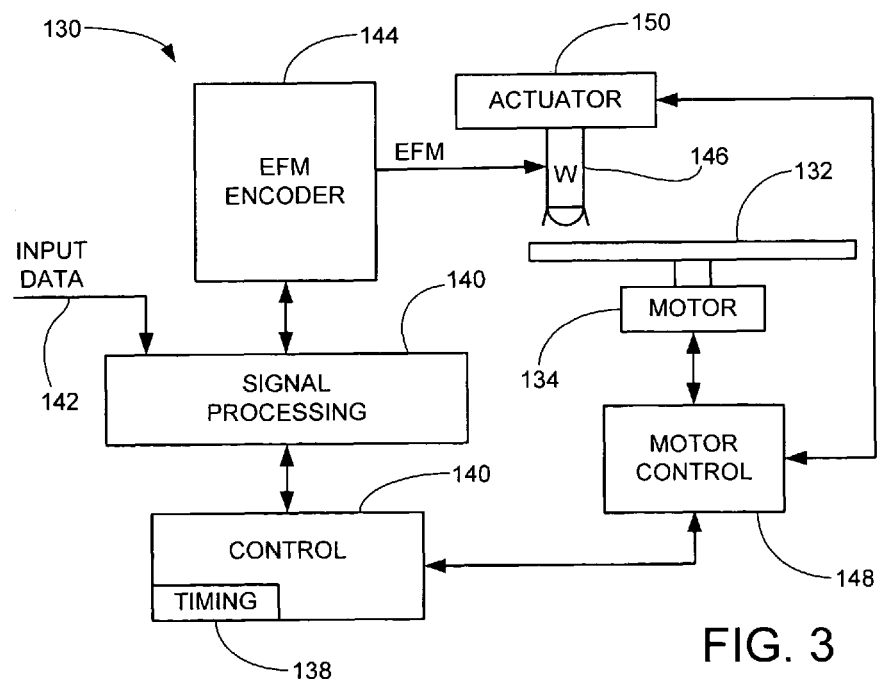
FIG. 3 provides a functional block diagram of a mastering system used to generate a master disc from which replicated, prerecorded discs such as shown in FIG. 2 can be made.

FIG. 3 illustrates a mastering system 130 used to create the master disc from which the disc 120 is replicated. The system 130 is preferably characterized as a laser beam recorder (LBR). A glass master 132 is provided with a spun-coat layer of photoresist, and is rotated by a motor 134.

A control block 136 with associated timing circuitry 138 provides top level control of the mastering process. A signal processing block 140 receives input data from path 142, formats the input data into the desired form and generates the requisite control data, error detection and correction codes, etc. The signal processing block 140 provides this data to an EFM (extended frequency modulation) encoder 144 which generates an EFM signal representative of the desired pit and land sequence on the glass master 132.

The EFM signal is used to modulate a write laser 146 to selectively expose the layer of photoresist. A motor control circuit 148 controls both the rotational speed of the glass master 132 and an actuator 150 used to advance the write laser 146 across the radius of the glass master.

Figure 4:
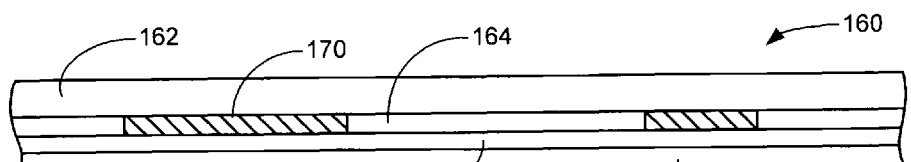
FIG. 4 provides a simplified elevational representation of a recordable medium to illustrate the general manner in which an internal dye layer is selectively processed to provide areas of different reflectivity to provide pit and land type areas in the recorded medium, the view in FIG. 4 generally taken along a track of the medium.

FIG. 4 provides a simplified elevational representation of a portion of a recordable optical disc 160. As with the prerecorded disc 120 of FIG. 2, the recordable disc 160 is also contemplated as being playable by the system 100 of FIG. 1.

The disc 160 generally includes a translucent substrate 162, a recording layer 164 preferably comprising a layer of nominally translucent dye, a reflective layer 166 preferably comprising a gold alloy or similar metal, and a protective backing layer 168.

During a recording operation, a write beam of light selectively impinges the recording layer 164 to cause a localized change in the reflectivity of the layer, such as shown by stripe 170. The stripe 170 has a different reflectivity as compared to the nonexposed portions of the recording layer. Thus, the exposed and non-exposed portions of the recording layer 164, in conjunction with the underlying reflective layer 166, cooperate to function as the pits and lands of the disc 120 of FIG. 2.

At this point it will be noted that recordable media such as 160 are becoming increasingly popular as a means for consumers to create their own media that can be played in standard media players. Commercial application providers are also increasingly using recordable media in lieu of standard replicated media to provide applications to the marketplace.

The use of prerecorded media eliminates the time required to utilize a mastering and replication process as depicted by FIG. 3.

Thus, for purposes herein, the term "pre-recorded" will be understood to refer to a disc (or other medium) to which data have already been written, either using permanently embossed pits and lands as shown in FIG. 2, or using recordable media as shown in FIG. 4.

The term "recordable" will be understood to refer to a disc (or other medium) to which data have yet to be written, and thus not only includes the write-once media of FIG. 4, but read-write media that can be written, erased, and rewritten multiple times.

It follows that a recordable disc such as 160 to which content has been supplied to some, but not all of the available disc recording area can be characterized as having a pre-recorded portion (i.e., that portion to which data have been written) as well as a recordable portion (i.e., that portion to which data have not yet been written).

Moreover, those skilled in the art will recognize that the respective views of FIGS. 2 and 4 can be combined to represent different portions of a single hybrid disc having both pre-recorded embossed portions (FIG. 2) as well as one or more recordable portions (FIG. 4).

Figure 5:
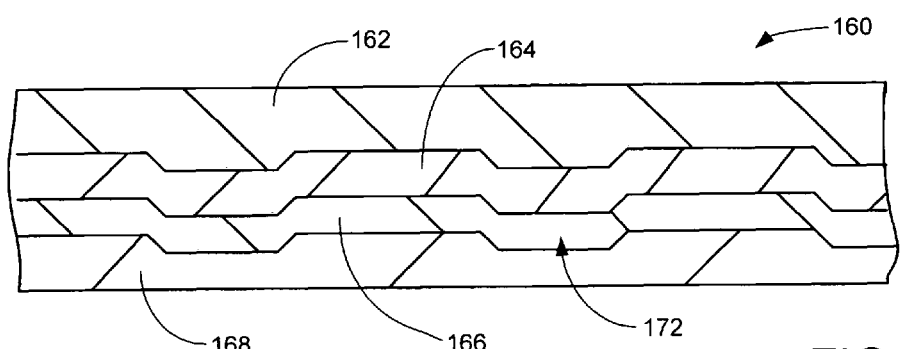
FIG. 5 provides an elevational representation of the recordable medium of FIG. 4 along a direction perpendicular to the view of FIG. 4.

The sectional view of FIG. 4 shows the disc 160 along a particular track. FIG. 5 is perpendicular to the view of FIG. 4 and provides a sectional view of the disc 160 across several physical tracks. The physical tracks are predefined using a wiggle pre-groove, denoted generally at 172. The pre-groove preferably comprises a continuous spiral that extends from the inner diameter (ID) to the outer diameter (OD) of the disc.

Instead of being perfectly concentric, the pre-groove 172 wobbles at a nominal frequency, such as 22.05 kilohertz (kHz) for a CD-R. This nominal carrier frequency provides motor speed control information to a disc writer system. In addition, the wobble is frequency modulated to provide sector address information commonly referred to as ATIP (absolute time in pre-groove).

The ATIP information is arranged in a number of sequential frames and provides information similar to the information provided by the Q channel in a conventional CD, such as elapsed time (in minutes, seconds and frames), starting and ending times for lead-in and lead-out, and error correction bytes.

ATIP information also typically includes disc type and manufacturer information, a recommended power setting during recording, a maximum recording speed, etc. The physical sectors of data subsequently written to the disc nominally align with the ATIP sectors; that is, the ATIP information serves to define where the actual data sectors will be subsequently placed on the disc.

Wiggle pre-grooves are generally mastered using equipment similar to that shown in FIG. 3. Such pre-grooves are also often used in other types of recordable media, such as recordable DVDs (DVD-R, etc.).

Figure 6:
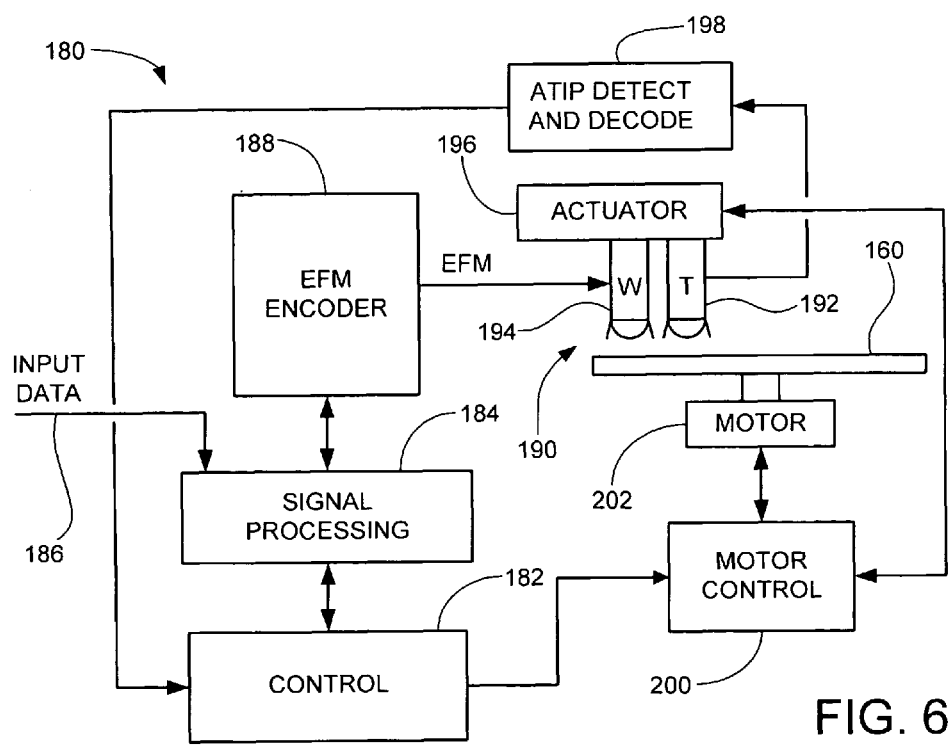
FIG. 6 provides a functional block diagram of a recording system used to write data to the recordable medium of FIGS. 4 and 5.

FIG. 6 provides a functional block diagram for an optical disc writer system 180 configured to selectively expose the recording layer 164 of the recordable disc 160 to write data thereto.

The system 180 includes a control block 182 that provides top level control for the system. A signal processing block 184 receives input data from path 186, formats the input data into the desired form and generates the requisite control data. The signal processing block 184 provides the processed data to encoder 188 which, as before, generates an EFM signal representative of the desired pit and land sequence on the disc 160.

The system 180 further includes a write assembly 190 comprising a tracking (T) laser assembly 192, a write (W) laser assembly 194 and an actuator 196. The tracking laser assembly 192 emits a light beam with selected focal depth and width to detect the pre-groove 172, while the write laser assembly 194 is modulated by the EFM signal to write the encoded data to the disc. A readback signal from the tracking laser assembly 192 is provided to an ATIP detect and decode block 198.

The block 198 decodes the timing information from the nominal frequency of the wobble to enable a motor control block 200 to provide the necessary control signals to a motor 202 to rotate the disc 160 at the appropriate velocity, and to enable the control block 182 to correctly position the write laser assembly 194 to nominally follow the pre-groove 172.

FIG. 7 provides a generalized representation of a format 204 for a selected disc to which data have been written during a single recording session. The format 204 includes a lead-in zone 206, a program area 208 and a lead-out zone 210. The content data stored to the program area 208 are shown to be arranged in two tracks, although this is for illustration only.

The tracks are identified at 212 and 214, and are separated by pause fields 216 and 218. For clarity, the term "track" as used in FIG. 7 does not refer to a physical track (i.e., a single revolution of the disc), but rather to a "logical track;" that is, a self-contained zone in which a cohesive set of data are stored (such as an audio track on an audio CD, etc.), as known in the art.

The lead-in and lead-out zones 206, 210 are configured in accordance with the applicable format to provide signals that allow the readback system 100 (FIG. 1) to identify the start and end of the disc. Additionally, the lead-in zone 206 is shown to include a table of contents (TOC) 220 which identifies, inter alia, the starting and ending addresses for each track, the start address for the lead-out 210, etc.

FIG. 8 provides a related format 224 for a recordable or hybrid disc to which data are recorded over multiple recording sessions. For purposes herein, the term "session" will be defined as a full set of operations carried out to successfully place content data on the associated medium. Thus, for example, the mastering and replication process described with respect to FIGS. 2 and 3 would be viewed as a single recording session, as would the operation of the system of FIG. 6 by a user to successfully record desired content data to a recordable disc using a personal computer.

It will be noted that in the latter example, if at the conclusion of the writing process the user immediately followed up by a relaunching of the attendant PC application program to begin afresh and add a new set of content data to the disc, such would be viewed as two separate sessions, even if such operations occurred sequentially in time. Thus, the term "session" as used herein is given its ordinary meaning as understood by those skilled in the art.

The format 224 in FIG. 8 has lead-in, program area and lead-out zones 226, 228 and 230, as before. A first track (TRACK 1) 232 comprises content data stored during a first recording session, and a second track (TRACK 2) 234 comprises content data that is subsequently added to the disc during a second recording session. Other fields shown in FIG. 8 include a pause field (P1) 236, a run-out field 238, a link field 240, and a run-in field 242 in the program area 228, and a TOC 244 in the lead-in 226.

For at least certain types of recordable media such as CD-R and CD-R/W, the writer system (e.g., 180) may not rely upon the TOC 244 in recording mode. Instead, the system will utilize a recordable memory area (RMA) field 246. This field can be located as desired, such as in the lead-in zone 226.

As those skilled in the art will recognize, the RMA 246 stores various information with regard to the content on the disc, such as the start and end locations for each recording session. Thus for example, at the end of session 1 (i.e., the writing of TRACK 1), the RMA 246 stores one start/end location for session 1.

At the end of session 2 (i.e., the writing of TRACK 2), the RMA 246 is updated to store a second start/end location for the second session, and so on. When the disc is full, or it is determined that no additional data will be written to the disc, the writer 180 preferably creates the table of contents from the RMA 246 and writes this to the TOC field 244 in the lead-in zone 226. It will be noted that once the TOC 244 has been written, the recordable disc can be read by any standard readback system as if the disc were actually a pre-recorded, embossed disc, if the content is of a selected type (e.g., CD audio).

Of particular note are the run-out, link and run-in fields 238, 240 and 242 in FIG. 8. These three fields are commonly employed to account for interleaving and error correction system requirements. For example, to fully recover the last sector of TRACK 1, it is generally necessary to additionally read the contents of the run-out field 238 since the last sector of TRACK 1 is interleaved over previous and later sectors on the disc. Similarly, the run-in field 242 is read in order to successfully recover the first sector in TRACK 2.

The link field 240 preferably comprises a dead zone to which no data have been written, and serves to separate the respective sessions since interleaving rules cannot generally be maintained with recordings that stop and start again.

FIG. 9 shows a format 254 that is similar to that of FIG. 8, and so like reference numerals have been used for similar features in both drawings. The format 254 is suitable for certain types of ROM discs, such as CD-ROM, which can require a copy of a file system near the beginning of the first track.

As those skilled in the art will recognize, some optical discs (and other types of media) store data in the form of files, which can be defined as logical groupings of sectors, the respective contents of which are combined to form a larger data structure (e.g., a "file"). File system conventions will vary depending upon the operational environment, but generally each entry in the file system will logically identify the start and end address of each file on the disc (or portion thereof).

Accordingly, during the first recording session, a first file system field 256 was incorporated into the TRACK 1 field 232 in order to identify the files stored in that track. During the subsequent recording session, a second file system field 258 was incorporated into the TRACK 2 field 234, with the contents of the second field 258 incorporating the contents of the first field 256, plus having appended thereto the additional file information for the files in the second track.

While operable, there are a number of undesirable limitations associated with these and other multi-session recording schemes. The overhead in terms of unusable space to accommodate multiple recording sessions can become significant, and can adversely affect the ability to get a selected amount of content onto a single disc.

Under many current schemes, even the addition of a very small recording session, such as the addition of a drive serial number, can require a new track, as well as all of the attendant fields associated therewith (new file system, run-in and run-out fields, etc.).

Moreover, it can be operationally inefficient and time consuming to search for the last track and locate the most up-to-date file system data on a disc when multiple copies are present, since there are few limitations on the numbers and sizes of the respective tracks that can be applied to a disc. When utilized, the RMA field can also present additional overhead costs in terms of both processing requirements and storage space.

Accordingly, FIG. 10 provides a novel format 300 for an optical disc (or other storage medium) with an improved multi-session capability. The exemplary format 300 includes lead-in, program area and lead-out zones 302, 304, and 306, as before. The program area 304 is shown to include a track 1 field 308, which stores one or more pre-recorded files that were written to the disc during a previous (e.g., first) recording session 310.

The pre-recorded field 308 includes pre-recorded file system data 312, which serves to identify the files stored in the field 308, as well as to identify the file(s) to the recorded to the disc during subsequent recording session(s) (314). Thus, when written, the file system data 312 pre-identifies one or more files that have not yet recorded onto the disc, nor will be during the current recording session.

These subsequently added files are preferably arranged in fields 316 (new file 1), 318 (new file 2) and 320 (new file 3). Of course, this is merely for illustration, in that multiple sets of files could readily be provided in each of these fields as desired. These fields 316, 318 and 320 are generally separated by gap fields 322, 324, 326 and 328 (G1 through G4). A TOC 330 is also written to the lead-in 302 during the previous recording session 310.

It will be noted that the new files in fields 316, 318 and 320 are in the first track (TRACK 1); while alternatively the new files could be arranged in one or more new tracks, such is unnecessary and indeed, might cause a standard readback system to overlook the data in field 312. Thus, multiple copies of the file system are avoided (as well as the need for the RMA zone).

As mentioned above, the pre-recorded file system data 312 preferably includes entries for each of the pre-recorded files in field 308, as well as placeholder entries for the new files. While the particular format for the file system data will vary widely depending on the requirements of a given application, Table 1 sets forth a generalized exemplary format to aid in the present discussion:

TABLE 1

| Name | Start Add. | End Address | Size | Type |
| --- | --- | --- | --- | --- |
| FILE 1 | X1 | X2 | 100 | SYSTEM |
| FILE 2 | X3 | X4 | 5,000 | DATA |
| FILE 3 | X5 | X6 | 1,350 | EXE |
| PLACEHOLDER 1 | X7 | X8 | 1,200 | PATCH |
| PLACEHOLDER 2 | X9 | X10 | 8 | ID |
| PLACEHOLDER 3 | X11 | X12 | 50 | SYSTEM |

The "placeholder" entries are defined during authoring and can be any length depending on the known and/or anticipated needs for the recordable areas.

The file names can also be arbitrarily defined, allowing the use of an additional table or other conversion mechanism during subsequent operation. The file names can alternatively be given standard names (e.g., disc_serial_no.bat; software_patch1.bat; software_patch2.bat; etc.) to readily allow subsequent access by the pre-recorded content, or by other applications. Provision can thus be readily be made for any number and types of additional files to be subsequently added to the disc.

With reference to FIG. 11, each of the gap fields 322, 324, 326 and 328 generally comprise a post-file field 332, a gap (link) field 334, and a pre-file field 336, which operate as before with respect to FIGS. 8 and 9. However, it will be noted that the pre-recorded file data 312 will identify these boundaries beforehand.

If a newly added file is added that is smaller than the size provided for in the file system 312, the gap field 334 can accordingly be made larger to take up the remaining space otherwise dedicated to the new file. An "actual length" indicator can be provisioned in a suitable reference table as needed so that the system 100 can verify the actual length of the file from the file itself rather than the file system data 312.

The file system data 312 can readily be generated in response to the control block 136 of the writer system 130 of FIG. 3, so that the data are provided on the glass master 132 and subsequent replicated discs 120. Alternatively, the file system data 312 can be generated in response to the control block 182 of the writer system 180 of FIG. 6 so that the data are arranged onto the recordable disc 160. It is contemplated that the resulting discs will be readily accessible by a standard readback system, such as 100 in FIG. 1.

It will now be appreciated that this novel format presents several advantages over the prior art. The format provides for an efficient utilization of hybrid and/or recordable discs, regardless whether only a very small amount, or significant amounts, of additional data are supplied to the disc. With this format, content providers can supply pre-recorded content on embossed or recordable areas and then update the discs with software patches, identification serial numbers or other information, copy protection algorithms, etc. as desired, either prior to or after shipment of the discs (such as during installation, via remote link, etc.).

While the foregoing discussion has generally presented single sided, single layer optical discs, the novel format can readily be extended to multi-sided, multi-layer discs, as well as other formats of media, optical or otherwise.

In view of the foregoing, it will now be understood that preferred embodiments of the present invention are generally directed to a data storage medium (such as 120, 160, 300), and a method and apparatus (such as 130, 180) for formatting the same. The medium is preferably characterized as an optical disc.

In accordance with preferred embodiments, the medium comprises a pre-recorded storage area (such as 308) and a recordable storage area (such as 316, 318, 320). The pre-recorded storage area stores file system data (such as 312) which identifies at least one file to be stored to the recordable storage area during a subsequent recording session (such as 314), and wherein the file system data are stored to the pre-recorded storage area during a previous recording session (such as 310).

Preferably, the file system data further identifies at least one file stored to the pre-recorded storage area during the previous recording session. The at least one file stored to the pre-recorded storage area is characterized as a first file, wherein the at least one file to be stored to the recordable storage area is characterized as a second file, and wherein the first and second files are each stored in a common logical track on the medium (see FIG. 10).

The file system data preferably comprises a placeholder entry for said at least one file to be recorded to the recordable storage area, said placeholder entry identifying a start address and an end address for said file (see Table 1).

In some embodiments, the medium is characterized as a hybrid optical disc so that the pre-recorded storage area is formed from a sequence of embossed pits and lands (such as at 120), and the recordable storage area is an area with a recordable layer which stores data in response to application of a write beam thereto (such as at 160). In other embodiments, the medium is characterized as a recordable optical disc with a recordable layer (such as 164) which stores data in response to application of a write beam (such as 194) thereto, wherein the pre-recorded storage area comprises a first portion of said layer that has been exposed to said write beam, and wherein the recordable storage area comprises a second portion of said layer that has not yet been exposed to said write beam.

The file to be subsequently stored to the medium can comprise a software patch to complement an executable file stored in the pre-recorded storage area, a unique serial number for the medium, etc.

For purposes of the appended claims, the recited means for directing will be understood consistent with the foregoing discussion to correspond to the disclose control blocks 136, 182 of FIGS. 3 and 6, respectively.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although embodiments described herein are generally directed to the formatting of optical discs, it will be appreciated that any number of different formats and types of optical discs, as well as any number of other formats and types of data storage media can be readily utilized without departing from the spirit and scope of the claimed invention.

What is claimed is:

1. A data storage medium comprising a pre-recorded storage area and a recordable storage area, wherein the pre-recorded storage area stores file system data which identifies at least one file to be stored to the recordable storage area during a subsequent recording session, wherein the pre-recorded storage area which stores the file system data can only be written once, wherein the file system data are stored to the pre-recorded storage area during a previous recording session, and wherein the file system data comprises a plurality of placeholder entries, each placeholder entry identifies a separate file to be subsequently written to the medium.

2. The data storage medium of claim 1, wherein the file system data further identifies at least one file stored to the pre-recorded storage area during the previous recording session.

3. The data storage medium of claim 2, wherein the at least one file stored to the pre-recorded storage area is characterized as a first file, wherein the at least one file to be stored to the recordable storage area is characterized as a second file, and wherein the first and second files are each stored in a common logical track on the medium.

4. The data storage medium of claim 1, wherein the file system data comprises a placeholder entry for said at least one file to be recorded to the recordable storage area, said placeholder entry identifying a start address and an end address for said file.

5. The data storage medium of claim 1, characterized as a hybrid optical disc so that the pre-recorded storage area is formed from a sequence of embossed pits and lands, and the recordable storage area is an area with a recordable layer which stores data in response to application of a write beam thereto.

6. The data storage medium of claim 1, characterized as a recordable optical disc with a recordable layer which stores data in response to application of a write beam thereto, wherein the pre-recorded storage area comprises a first portion of said layer that has been exposed to said write beam, and wherein the recordable storage area comprises a second portion of said layer that has not yet been exposed to said write beam.

7. The data storage medium of claim 1, wherein the at least one file to be stored to the recordable storage area comprises a software patch to complement an executable file stored in the pre-recorded storage area.

8. The data storage medium of claim 1, wherein the at least one file to be stored to the recordable storage area comprises a unique serial number for the medium.

9. The data storage medium of claim 1, characterized as an optical disc.

10. A method comprising steps of:
providing a data storage medium comprising a recordable storage area configured to store at least one file during a subsequent recording session; and
storing file system data to another area of the medium which identifies the at least one file prior to the subsequent recording session, wherein said another area of the storing step comprises a second recordable area of the medium comprising a recordable layer which stores data in response to application of a write beam thereto, wherein said file system data are stored by said recordable layer, wherein said second recordable area of the medium which stores said file system data can only be written once.

11. The method of claim 10, wherein said another area of the storing step comprises a pre-recorded storage area in which the file system data are stored as a sequence of embossed pits and lands.

12. The method of claim 10, wherein the storage medium is characterized as an optical disc.

13. The method of claim 10, wherein the at least one file to be stored to the recordable storage area comprises a unique serial number for the medium.

14. A data storage medium comprising a pre-recorded storage area and a recordable storage area, wherein the pre-recorded storage area stores file system data which identifies at least one file to be stored to the recordable storage area during a subsequent recording session, and wherein the file system data are stored to the pre-recorded storage area during a previous recording session, wherein the data storage medium is characterized as a recordable optical disc with a recordable layer which stores data in response to application of a write beam thereto, wherein the pre-recorded storage area comprises a first portion of said layer that has been exposed to said write beam, wherein the pre-recorded storage area which stores the file system data can only be written once, wherein the recordable storage area comprises a second portion of said layer that has not yet been exposed to said write beam, and wherein the recordable optical disc is configured to be read by an optical disc readback system.

15. The data storage medium of claim 14, wherein the file system data further identifies at least one file stored to the pre-recorded storage area during the previous recording session.

16. The data storage medium of claim 14, wherein the file system data comprises a placeholder entry for said at least one file to be recorded to the recordable storage area, said placeholder entry identifying a start address and an end address for said file.

17. The data storage medium of claim 14, wherein the at least one file to be stored to the recordable storage area comprises a software patch to complement an executable file stored in the pre-recorded storage area.

18. The data storage medium of claim 14, wherein the at least one file to be stored to the recordable storage area comprises a unique serial number for the medium.

19. A data storage medium comprising a pre-recorded storage area and a recordable storage area, wherein the pre-recorded storage area stores file system data which identifies at least one file to be stored to the recordable storage area during a subsequent recording session, wherein the pre-recorded storage area which stores the file system data can only be written once, and wherein the file system data are stored to the pre-recorded storage area during a previous recording session, wherein the at least one file to be stored to the recordable storage area comprises a unique serial number for the medium.

20. The data storage medium of claim 19, wherein the file system data comprises a placeholder entry for said at least one file to be recorded to the recordable storage area, said placeholder entry identifying a start address and an end address for said file.

21. The data storage medium of claim 19, characterized as an optical disc.

22. The data storage medium of claim 1, wherein the file system data stored by the pre-recorded storage area identifies a pre-defined name of the at least one file to be stored to the recordable storage area, the pre-defined name subsequently used to identify said file in a file system stored to the medium.

23. The data storage medium of claim 1, wherein the file system data stored by the pre-recorded storage area comprises a multi-character alphanumeric representation of the at least one file to be stored to the recordable storage area, said alphanumeric representation subsequently recorded to the recordable storage area.

24. The data storage medium of claim 1, wherein the file system data stored by the pre-recorded storage area identifies the at least one file to be stored to the recordable storage area with a *.bat file name extension.

25. The data storage medium of claim 1, wherein the file system data stored by the pre-recorded storage area are permanently embossed in the pre-recorded storage area.

* * * * *